April 19, 1960   W. E. McINTYRE, JR   2,933,417
ONE-SIDE FILM COATING PROCESS
Filed March 12, 1958
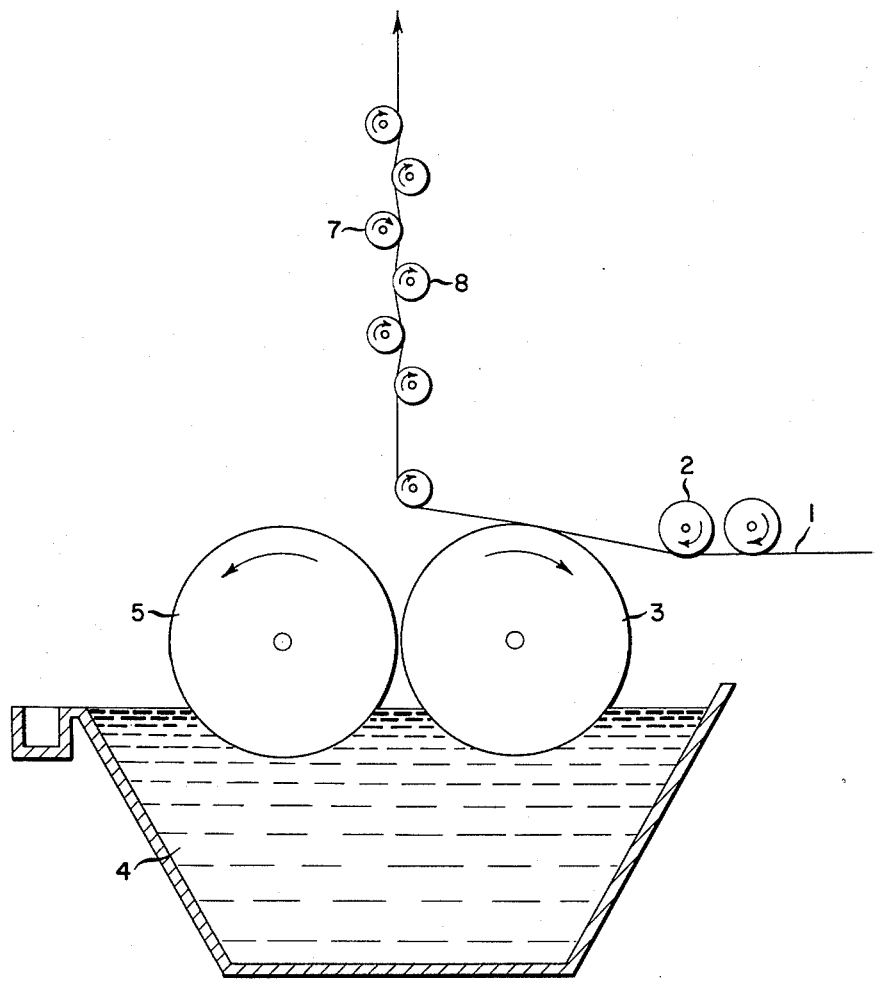
INVENTOR
WILLIAM ERNEST McINTYRE JR,
BY *[signature]*
ATTORNEY 2,933,417
ONE-SIDE FILM COATING PROCESS William Ernest McIntyre, Jr., Buffalo, N.Y., assignor to E. I. du Pont de Nemours and Company, Wilmington, Del., a corporation of Delaware Application March 12, 1958, Serial No. 720,896

4 Claims. (Cl. 117—111)

This invention relates to the coating of non-fibrous continuous webs and more particularly to the one-side coating of continuous non-fibrous webs (i.e., films) of hydrophobic, thermoplastic organic polymeric material with liquid coating compositions.

Films prepared from hydrophobic resins, such as polyethylene terephthalate, find extensive use in a great many industrial applications by reason of their superior physical and chemical properties. It is often necessary, however, to apply coatings of other polymeric materials to one side of these films to impart additionally desired properties such as increased heat-sealability, moistureproofness, etc. Many methods of imparting coatings to one side of these films are known to the art. Such methods usually involve the passage of the film in the form of a web through the nips of a set of closely spaced rolls consisting of an applicator roll, partially immersed in a dip pan containing the coating solution or dispersion and a metering roll. The amount of coating applied is controlled by the distance between the nips of the two rolls. The coating is then redistributed uniformly by means of smoothing rolls. This method and other such methods involving similar technology, however, experience severe drawbacks. When one attempts to utilize such methods, for example, in the one-side coating of films utilizing an aqueous dispersion of coating ingredients, and particularly low viscosity aqueous dispersion (10–15 centipoises), several undesirable effects are likely to be encountered. Among these are (1) "runback" of dispersion occurring in the nip of the rolls causing excess dispersion to be picked up on the edges of the dry side of the film from the metering roll, thereby necessitating subsequent trimming of the coated film to eliminate the two-side coated edges with resultant waste of film, (2) transfer of coating dispersion from the applicator roll to the metering roll causing coating to be applied to the dry side of the film, (3) build-up of dried polymer on the edges of the metering roll thereby causing the rolls to be forced apart, and in doing so causing excess coating to be applied to the film, (4) build-up of dried polymer on the smoothing rolls resulting in the smoothing rolls exerting a drag on the film, and (5) undesirable foaming at the nip of the rolls.

An object of this invention, therefore, is to provide an improved process for the one-side coating of continuous non-fibrous webs of hydrophobic, thermoplastic organic polymeric material. Another object is to provide an improved process for the one-side coating of a continuous film of polyethylene terephthalate. Still another object is to provide an improved process for the one-side coating of polyethylene terephthalate film and like hydrophobic, thermoplastic organic polymeric film with aqueous dispersion coating compositions of low viscosity. These and other objects will more clearly appear from the description which follows.

The foregoing objects are realized by the present invention which, briefly stated, comprises tangentially contacting one surface on a continuous non-fibrous web of hydrophobic thermoplastic organic polymeric material, e.g., polyethylene terephthalate film, advancing at a uniform predetermined linear speed, with a rotating cylindrical surface carrying at the point of tangency a predetermined thickness (measured amount) of an aqueous dispersion coating composition having a viscosity of not greater than 100 centipoises, said cylindrical surface being rotated in a direction opposite to the direction of travel of the advancing web and at a constant peripheral speed of from 15% to 50% greater than the linear speed of said advancing web, whereby a uniform layer of the coating composition is deposited on said web surface.

In the description of examples to follow, particular emphasis will be placed on the coating of polyethylene terephthalate film from low viscosity aqueous dispersions of polymeric materials. It is to be understood, however, that this process is applicable to any film prepared from a hydrophobic [1] organic thermoplastic polymeric resin such as copolymers of acrylonitrile and vinyl chloride, polyvinyl chloride, copolymers of vinyl chloride and a vinyl ester of a lower fatty acid ester or of acrylic or alpha-methacrylic acid, polystyrenes, polyamides, polyacrylonitriles, copolymers of acrylonitrile with vinyl acetate and with vinylidene chloride and organic derivatives of cellulose such as cellulose acetate and the acetate-butyrates.

The process of the present invention is useful for coating base film with any aqueous dispersion coating composition having a viscosity no greater than 100 centipoises. As examples of materials, in addition to vinylidene chloride polymers which may be coated from low viscosity aqueous dispersions, there may be mentioned methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and

[1] Hydrophilic films such as regenerated cellulose do not adapt themselves to one-side coating from aqueous dispersions because of the tendency of such films to rapidly absorb water and in doing so the edges of the uncoated side curl toward the center, forming a tubular configuration.

other unsaturated aliphatic ethers described in U.S. Patent No. 2,160,943. Ultraviolet light absorbent compounds which may be applied in the form of aqueous dispersions are the substituted benzophenone derivatives of the formula

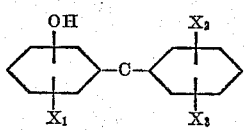

wherein $X_1$, $X_2$ and $X_3$ are selected from the group consisting of hydrogen, hydroxy, alkyl, alkoxy and halogen. The preferred substituted benzophenone derivatives include 2,2',4,4' - tetrahydroxybenzophenone 2,2' - dimethoxy-4,4' - dihydroxy benzophenone, 2 - hydroxy-4-methoxybenzophenone, 2,2'-dihydroxy - 4 - methoxy-4'-ethoxybenzophenone, 2-hydroxy - 4 - pentadecylbenzophenone, and dibenzyl resorcinol.

A preferred embodiment of the process of this invention will now be described with reference to the accompanying drawing wherein the single figure is a schematic view illustrating a preferred arrangement of apparatus for carrying out the process.

Referring to the drawing: The continuous non-fibrous web (film) 1 to be treated passes under uniform tension from the unwind rolls (not shown) as a flat sheet beneath (or over) a set of rolls 2 at a uniform speed in the range of from 30–600 feet/minute. These rolls which may be either spreader rolls or common idler rolls, serve to flatten out the film, thus materially eliminating loosely wound mill rolls and other base film defects. After passing under the rolls 2 the film contacts an applicator roll 3 located at a distance of from 8–12 inches from the nearest of rolls 2 and partially immersed in a coating bath 4 containing the aqueous dispersion coating composition, at substantially a point of tangency. The roll rotates at a peripheral speed of from 15–50%, preferably 20–25% greater than the linear speed of the film in a direction reverse to that of the advancing film. The film in coming in contact with this applicator roll picks up the aqueous dispersion coating composition. The amount of coating composition applied is preferably controlled by the clearance between the applicator doctor roll and a metering roll 5. The metering roll also dips into the coating bath and rotates at a speed substantially the same as that of the applicator roll and in an angular direction opposite to that of the applicator roll. By allowing the film to tangentially contact the applicator roll and by rotating this roll at a peripheral speed 15–50% greater than that of the advancing film, the film may be successfully coated without undesirable "runback" or build-up of dried coating on the applicator roll. If the peripheral speed of the applicator rolls is equal to or less than the film speed, almost all the coating dispersion is wiped from the roll by the film. This results in a rapid build-up of dried coating on the doctor roll. If the speed of the applicator roll is increased 15–50% above film speed, sufficient liquid coating (dispersion) is left on the roll to prevent coating build-up. The exact speed differential to be used depends on such factors as film tension, the amount of film wrap on the applicator roll (in contacting the film at substantially a point of tangency the film will come in contact from ½ inch to 1 inch of the roll surface), film speed, and the amount of coating being applied to the film. The coating weights which may be applied to the film by the present process range from 0.1–20 grams/square meter of film surface. The preferred amount of coating applied to the film ranges between 4 and 8 grams/square meter. After applying the coating material, the film is then passed through a series of smoothing rolls. The smoothing rolls 7 on the coated side of the film are run in a direction reverse to that of the film and at a peripheral speed 10–100% of that of the film speed, preferably 15–80%. Under these conditions, coating thickness variations in the longitudinal direction are minimized and striations are more effectively removed from the coated film. The smoothing rolls 8 on the dry side of the advancing coated film are preferably rotated in the same direction as the film (because of the high film tension necessary) and at substantially the same speed. These smoothing rolls may be in a fixed state or allowed to idle, but good film appearance is more difficult to obtain. After passing through the smoothing rolls, the film passes through a drying tower (not shown) and thence is wound up.

The arrangement described above of an applicator roll and a metering roll both dipping into the coating dispersion and rotating at the same peripheral speed and in opposite angular directions is a critical feature of the invention. I have found that low viscosity dispersions of organic polymeric material (dispersions having a viscosity of not greater than 100 centipoises) are shear unstable, i.e., the dispersions tend to break down when subjected to shearing forces such as are encountered in the nip of rolls moving in opposite linear directions at the nip, or moving at different peripheral speeds. Consequently, it is essential that shearing forces be avoided, and this is accomplished according to the present invention by operating the applicator and the metering rolls at the same peripheral speed and in opposite angular directions so that they are operating in the same linear direction at the nip formed between the two rolls. Moreover, by dipping both rolls in the coating bath, they are continuously washed free of coating agglomerates or dried coating which would otherwise build up on the roll surface.

The following examples will further serve to illustrate the principles and practice of the present invention. Although in the examples to follow, particular emphasis will be placed on the top-coating of one side of a hydrophobic organic thermoplastic polymer film from aqueous dispersions of polymer, it should be emphasized that the method of coating outlined hereinbefore may also be successfully utilized for the application of both a sub- and/or top-coating of polymeric materials from low viscosity aqueous coating dispersions to such films.

EXAMPLES 1–42

In the following examples, oriented, heat-set polyethylene terephthalate film (0.0005" thick) was coated on one side with varying polymeric coating compositions utilizing the method and apparatus described hereinbefore. The film was conducted through the spreader roll at speeds of 30–530 feet/minute and was brought into contact with the applicator doctor roll at a point of substantial tangency; coatings varying between 4–8 grams/square meter were applied to the film by adjusting the distance between the applicator roll and the metering roll (0.00025–0.001 inch). In Examples 1–5, the peripheral speed of the applicator roll was substantially the same as the film. In the remainder of the examples, the speeds of the applicator roll were varied between 19–50% in excess of that of the film speed. After the coating was applied, the film was passed through a series of smoothing rolls in order to remove any striations formed in the application of the coating. The rolls on the dry side of the film were run at substantially the same speed as the film. The smoothing rolls on the coated side were run at speeds 15–75% that of the film speeds. The film was then passed through a conventional drying tower dried and wound up. Table I lists the dispersion compositions utilized, percent solids of the coating composition, additives, i.e., surfactants and slip promoting agents, film speed in feet per minute (f.p.m.), applicator roll speed in feet per minute, smoothing roll speed in feet per minute, coating weight applied in grams/square meter and the appearance of the film.

Table 1

ONE-SIDE COATING OF POLYETHYLENE TEREPHTHALATE FILM

| Example | Dispersion Composition | Percent Solids | Additives | Film Speed (f. p. m.) | Applicator Roll Speed (f. p. m.) | Smoothing Roll Speed (f. p. m.) | | Coating Weight (g./m.³) | Appearance |
|---|---|---|---|---|---|---|---|---|---|
| | | | | | | Coated Side | Dry Side | | |
| 1 | 94/6/2—VCl₂/MA/IA [1] | 37 | 1.0% "Geon" 126 [2]<br>4.0% "Duponol" ME [3] | 30 | 30 | 20 | Fixed | 5.6 | Streaked. |
| 2 | 94/6/2—VCl₂/MA/IA | 37 | 1.0% "Geon" 126 [2]<br>4.0% "Duponol" ME [3] | 60 | 60 | 25 | Idled | 4.7 | Poor. |
| 3 | 94/6/2—VCl₂/MA/IA | 37 | 1.0% "Geon" 126 [2]<br>4.0% "Duponol" ME [3] | 90 | 90 | 25 | ...do | 4.4 | Do. |
| 4 | 94/6/2—VCl₂/MA/IA | 37 | 1.0% "Geon" 126 [2]<br>4.0% "Duponol" ME [3] | 150 | 150 | 75 | Fixed | 3.4 | Do. |
| 5 | 94/6/2—VCl₂/MA/IA | 37 | 1.0% "Geon" 126 [2]<br>4.0% "Duponol" ME [3] | 217 | 217 | 110 | ...do | 3.2 | Do. |
| 6 | 94/6/2—VCl₂/MA/IA | 37 | 1.0% "Geon" 126 [2]<br>4.0% "Duponol" ME [3] | 30 | 45 | 10 | ...do | 4.2 | Good. |
| 7 | 94/6/2—VCl₂/MA/IA | 37 | 1.0% "Geon" 126 [2]<br>4.0% "Duponol" ME [3] | 30 | 38 | 15 | 30 | 3.8 | Do. |
| 8 | 94/6/2—VCl₂/MA/IA | 30 | 0.5% "Geon" 126<br>4.0% "Duponol" ME | 45 | 56 | 10 | 45 | 4.7 | Do. |
| 9 | 94/6/2—VCl₂/MA/IA | 30 | 0.5% "Geon" 126<br>4.0% "Duponol" ME | 45 | 56 | 10 | 45 | 4.0 | Do. |
| 10 | 94/6/2—VCl₂/MA/IA | 30 | 0.5% "Geon" 126<br>4.0% "Duponol" ME | 45 | 60 | 10 | 45 | 4.7 | Do. |
| 11 | 94/6/1—VCl₂/MA/IA | 30 | 0.5% "Geon" 126<br>2.0% "Duponol" ME<br>2.0% "Santomerse" 3 [4]<br>0.4% "Daxad" 11 [5] | 45 | 56 | 10 | 45 | 3.4 | Do. |
| 12 | 94/6/1—VCl₂/MA/IA | 30 | 0.5% "Geon" 126<br>2.0% "Duponol" ME<br>2.0% "Santomerse" 3 [4]<br>0.4% "Daxad" 11 [5] | 45 | 60 | 10 | 45 | 4.4 | Do. |
| 13 | 94/6/1—VCl₂/MA/IA | 30 | 0.5% "Geon" 126<br>2.0% "Duponol" ME<br>2.0% "Santomerse" 3 [4]<br>0.4% "Daxad" 11 [5] | 45 | 60 | 10 | 45 | 3.6 | Do. |
| 14 | 94/6/1—VCl₂/MA/IA | 48 | 0.5% "Geon" 126<br>2.0% "Duponol" ME<br>2.0% "Santomerse" 3 [4]<br>0.4% "Daxad" 11 [5] | 30 | 39 | 10 | 30 | 6.2 | Do. |
| 15 | 94/6/1—VCl₂/MA/IA | 42 | 0.5% "Geon" 126<br>2.0% "Duponol" ME<br>2.0% "Santomerse" 3<br>0.4% "Daxad" 11 | 30 | 39 | 10 | 30 | 5.6 | Do. |
| 16 | 94/6/1—VCl₂/MA/IA | 37 | 0.5% "Geon" 126<br>2.0% "Duponol" ME<br>2.0% "Santomerse" 3<br>0.4% "Daxad" 11 | 30 | 39 | 10 | 30 | 5.2 | Do. |
| 17 | 94/6/1—VCl₂/MA/IA | 30 | 0.5% "Geon" 126<br>2.0% "Duponol" ME<br>2.0% "Santomerse" 3<br>0.4% "Daxad" 11 | 45 | 60 | 10 | 45 | 3.9 | Do. |
| 18 | 94/6/1—VCl₂/MA/IA | 37 | 0.5% "Geon" 126<br>2.0% "Duponol" ME<br>2.0% "Santomerse" 3<br>0.4% "Daxad" 11 | 75 | 91 | 58 | 75 | 3.7 | Do. |
| 19 | 94/6/1—VCl₂/MA/IA | 37 | 0.5% "Geon" 126<br>2.0% "Duponol" ME<br>2.0% "Santomerse" 3<br>0.4% "Daxad" 11 | 80 | 95 | 63 | 80 | 3.3 | Do. |
| 20 | 94/6/1—VCl₂/MA/IA | 37 | 0.5% "Geon" 126<br>2.0% "Duponol" ME<br>2.0% "Santomerse" 3<br>0.4% "Daxad" 11 | 80 | 95 | 62 | 80 | 4.1 | Do. |
| 21 | 94/6/1—VCl₂/MA/IA | 37 | 0.5% "Geon" 126<br>2.0% "Duponol" ME<br>2.0% "Santomerse" 3<br>0.4% "Daxad" 11 | 120 | 143 | 93 | 120 | 3.9 | Do. |
| 22 | 94/6/1—VCl₂/MA/IA | 37 | 0.5% "Geon" 126<br>2.0% "Duponol" ME<br>2.0% "Santomerse" 3<br>0.4% "Daxad" 11 | 121 | 143 | 93 | 121 | 3.9 | Do. |
| 23 | 94/3/3/1/1—VCl₂/MA/AN [1]/MAA [1]/AGE [1]. | 50 | 0.3% "Geon" 126<br>4.0% "Duponol" ME | 120 | 147 | 92 | 120 | 3.4 | Do. |
| 24 | 94/3/3/1/1—VCl₂/MA/AN [1]/MAA [1]/AGE [1]. | 50 | 0.3% "Geon" 126<br>4.0% "Duponol" ME | 120 | 147 | 92 | 120 | 4.9 | Do. |
| 25 | 94/3/3/1/1—VCl₂/MA/AN [1]/MAA [1]/AGE [1]. | 50 | 0.3% "Geon" 126<br>4.0% "Duponol" ME | 116 | 143 | 85 | 116 | 3.9 | Do. |
| 26 | 94/3/3/1/1—VCl₂/MA/AN [1]/MAA [1]/AGE [1]. | 50 | 0.3% "Geon" 126<br>4.0% "Duponol" ME | 119 | 141 | 89 | 119 | 4.6 | Do. |
| 27 | 94/3/3/1/1—VCl₂/MA/AN [1]/MAA [1]/AGE [1]. | 50 | 0.3% "Geon" 126<br>4.0% "Duponol" ME | 122 | 146 | 90 | 122 | 3.1 | Do. |
| 28 | 90/10/1—VCl₂/AN/IA | | 0.5% "Geon" 126<br>4.0% "Duponol" ME | 45 | 60 | 10 | 45 | 4.3 | Do. |
| 29 | 90/10/1—VCl₂/AN/IA | | 0.5% "Geon" 126<br>4.0% "Duponol" ME | 32 | 75 | 15 | 32 | 7.8 | Do. |
| 30 | 94/3/3/1/1—VCl₂/MA/AN/MAA/AGE. | | 0.3% "Geon" 126<br>4.0% "Duponol" ME | 116 | 140 | 86 | 116 | 4.2 | Do. |
| 31 | 94/3/3/1/1—VCl₂/MA/AN/MAA/AGE. | | 0.3% "Geon" 126<br>4.0% "Duponol" ME | 120 | 145 | 90 | 120 | 4.0 | Do. |
| 32 | 94/3/3/1/1—VCl₂/MA/AN/MAA/AGE. | | 0.3% "Geon" 126<br>4.0% "Duponol" ME | 122 | 145 | 92 | 122 | 4.9 | Do. |
| 33 | 94/3/3/1/1—VCl₂/MA/AN/MAA/AGE. | | 0.3% "Geon" 126<br>4.0% "Duponol" ME | 121 | 143 | 91 | 121 | 4.4 | Do. |
| 34 | 94/3/3/1/1—VCl₂/MA/AN/MAA/IA. | 50 | 0.5% "Geon" 126<br>0.1% "Duponol" ME<br>0.2% "Santomerse" 3<br>0.4% "Daxad" 11 | 45 | 75 | 30 | 45 | 5.3 | Do. |
| 35 | 94/3/3/1/1—VCl₂/MA/AN/MAA/IA. | 50 | 0.5% "Geon" 126<br>0.1% "Duponol" ME<br>0.2% "Santomerse" 3<br>0.4% "Daxad" 11 | 120 | 180 | 87 | 120 | 4.2 | Do. |

See footnotes at end of table.

Table I—Continued
ONE-SIDE COATING OF POLYETHYLENE TEREPHTHALATE FILM—Continued

| Example | Dispersion Composition | Percent Solids | Additives | Film Speed (f.p.m.) | Applicator Roll Speed (f.p.m.) | Smoothing Roll Speed (f.p.m.) Coated Side | Dry Side | Coating Weight (g./m.²) | Appearance |
|---|---|---|---|---|---|---|---|---|---|
| 36 | 94/3/3/1/1—VCl₂/MA/AN/MAA/IA | 50 | 0.5% "Geon" 126<br>0.1% "Duponol" ME<br>0.2% "Santomerse" 3<br>0.4% "Daxad" 11 | 202 | 246 | 87 | 120 | 5.2 | Good. |
| 37 | 94/3/3/1/1—VCl₂/MA/AN/MAA/IA | 38 | 0.3% "Geon" 126<br>1.0% "Duponol" ME<br>0.2% "Santomerse" 3<br>0.4% "Daxad" 11 | 106 | 140 | 32 | 97 | 5.1 | Do. |
| 38 | 94/3/3/1/1—VCl₂/MA/AN/MAA/IA | 38 | 0.3% "Geon" 126<br>1.0% "Duponol" ME<br>0.2% "Santomerse" 3<br>0.4% "Daxad" 11 | 150 | 200 | 44 | 122 | 4.8 | Do. |
| 39 | 94/3/3/1/1—VCl₂/MA/AN/MAA/IA | 45 | 0.3% "Geon" 126<br>1.0% "Duponol" ME<br>0.2% "Santomerse" 3<br>0.4% "Daxad" 11 | 150 | 200 | 60 | 150 | 4.7 | Do. |
| 40 | 94/6/1—VCl₂/MA/IA | 50 | 0.5% "Geon" 126<br>2.0% "Duponol" ME<br>2.0% "Santomerse" 3<br>0.4% "Daxad" 11 | 171 | 204 | 138 | 171 | 2.7 | Do. |
| 41 | 94/6/1—VCl₂/MA/IA | 50 | 0.5% "Geon" 126<br>2.0% "Duponol" ME<br>2.0% "Santomerse" 3<br>0.4% "Daxad" 11 | 240 | 282 | 186 | 240 | 2.7 | Do. |
| 42 | 94/6/1—VCl₂/MA/IA | 50 | 0.5% "Geon" 126<br>2.0% "Duponol" ME<br>2.0% "Santomerse" 3<br>0.4% "Daxad" 11 | 444 | 531 | 363 | 444 | 2.7 | Do. |

[1] VCl₂—vinylidene chloride. MA—methyl acrylate. IA—itaconic acid. AN—acrylonitrile. MAA—methacrylic acid. AGE—allyl glycidyl ether.
[2] "Geon" 126—polyvinyl chloride (B. F. Goodrich Co.).
[3] "Duponol" ME—sodium lauryl sulfate (E. I. du Pont de Nemours & Co.).
[4] "Santomerse" 3—surface-active wetting agent—salt of a homologous series of substituted aromatic sulfonic acids (Monsanto Chemical Co.).
[5] "Daxad" 11—dispersing agent—polymerized sodium salt of alkyl aryl sulfonic acids (Dewy & Almy Chemical Co.).

From Table I it can be seen that the coated polyethylene terephthalate films having varying coating weights possessing good appearance can be produced by the process of the present invention. The criticality of operating the applicator doctor roll at speeds of at least 15% or greater than the film speed (Examples 6–42) is clearly illustrated by comparison with Examples 1–5, where film with poor appearance was obtained when the film speed and applicator doctor roll speeds were substantially the same. No trouble was experienced with dry polymer build-up on either the applicator or metering rolls and "runback" of the coating compositions around the edges of the uncoated side of the film encountered in conventional coating processes.

EXAMPLE 43

This example illustrates the application of both a sub- and top-coating of polymeric coating materials on an oriented polyethylene terephthalate film by means of the process of the present invention utilizing the method and apparatus described hereinbefore. The film (0.0005" thick) was first sub-coated with a copolymeric coating composition comprising 2-ethylhexyl acrylate, acrylonitrile and itaconic acid. After drying the film, a copolymeric top-coating consisting of vinylidene chloride, methyl acrylate, acrylonitrile, methacrylic acid and allyl glycidyl ether was applied to the film in the manner described hereinbefore. An excellent appearing film with enhanced physical properties was obtained. Table II lists the dispersion compositions used, the percent solids of the coating composition, additives, film speeds, applicator doctor roll speeds, smoothing roll speeds, coating weight applied and the general appearance of the film.

Table II
ONE-SIDE COATING OF POLYETHYLENE TEREPHTHALATE FILM

| | Sub-Coating | Top-Coating |
|---|---|---|
| Dispersion Composition | 80% 2-ethyl hexyl acrylate<br>20% acrylonitrile<br>1% itaconic acid | 94% vinylidene chloride.<br>6% methyl acrylate.<br>2% itaconic acid. |
| Additives | 2.0% "Suliramin" AB [1]<br>2.0% "Duponol" ME | 0.5% "Geon" 126.<br>4.0% "Duponol" ME. |
| Film Speed (f.p.m.) | 45 | 45. |
| Applicator Roll Speed (f.p.m.) | 60 | 60. |
| Smoothing Roll Speed (f.p.m.): | | |
|   Coated Side | 10 | 10. |
|   Dry Side | 45 | 45. |
| Coating Weight (g./m.²) | 4.2 | 4.7. |
| Percent Solids | | 30%. |
| Appearance | Good | Good. |

[1] Surface active wetting agent.

EXAMPLE 44

Oriented, heat-set polyethylene terephthalate film (0.001" thick) was coated on one side with a 6% by weight, aqueous dispersion of "Uvinul" D–49 (2,2'-dihydroxy-4,4'-dimethoxy benzophenone—Antara Chemicals Division of General Aniline & Film Corporation, New York, New York), utilizing the method and apparatus described hereinbefore. The film was conducted through the spreader roll at a speed of 30 feet/minute, and was brought into contact with the applicator roll at a point of substantial tangency. The applicator roll was rotated at a speed of 35 feet/minute. The distance between the applicator roll and the metering roll was set at 0.0005" thereby to apply 0.6 g./m.$^2$ of coating on the surface of the film as in the previous examples. The film was then passed through a series of smoothing rolls in order to remove any striations formed in the application of the coating. The film was passed through a conventional drying tower. The resulting film exhibited a high degree of resistance to the degradative effects of ultraviolet light waves.

EXAMPLE 45

In the manner of Example 44, oriented, heat-set polyethylene terephthalate film (0.0005" thick) was coated with a 7% by weight aqueous dispersion of "Uvinul" D-49. The film was passed into contact with the applicator roll at a point of substantial tangency at a speed of 20 feet/minute. The clearance between the metering roll and the applicator roll was set at 0.0005". The applicator roll was rotated at a speed of 23 feet/minute. After drying, the film was passed through the apparatus in an exactly similar fashion to coat the opposite side of the film. A total coating weight of 1.3 g./m.$^2$ was thus applied to the film. The resulting two-side coated film exhibited excellent resistance to the effects of ultraviolet light. This process may also be used to successfully coat aqueous dispersions of polyethylene onto polyethylene terephthalate films.

The process of the present invention makes it possible to produce one-side coated hydrophobic organic thermoplastic polymeric film possessing excellent appearance. The resulting film coatings are clear, clean, uniform, free of unsightly striations, spotting and scratches. This process lends itself to high speed coating operations which are essentially free from objectionable build-up of dried coating composition on the doctor rolls, thereby eliminating costly shutdown for cleaning and resetting of the doctor rolls and from "runback" of the coating composition around the sides of the uncoated side of the film, thus materially cutting down film waste. This process in providing for smooth uniform coatings also minimizes the effect of uneven heat shrinkage of the film, which when dried results in unsightly distortions such as streaks.

I claim:
1. A process for the continuous one-side coating of a continuous web which comprises partially submerging a rotating cylindrical surface rotating on a fixed axis in a bath of an aqueous dispersion coating composition having a viscosity of not greater than 100 centipoises to apply said coating composition to said surface; controlling the thickness of said coating composition by means of a second rotating cylindrical surface partially submerged in said bath and rotating in an angular direction opposite to the direction of the first named cylindrical surface on an axis parallel to the axis of said first named cylindrical surface and at substantially the same peripheral speed, said surfaces being spaced apart a distance equal to substantially twice the desired thickness of the coating; and tangentially contacting one surface of a continuously advancing non-fibrous web of hydrophobic thermoplastic organic polymeric material, advancing at a constant predetermined speed, with the rotating coated cylindrical surface carrying the controlled thickness of coating composition, said coated cylindrical surface rotating in a direction opposite that of the web and at a constant peripheral speed of from 15% to 50% greater than the speed of the web whereby to apply a uniform coating of said coating composition to said web surface.

2. The process of claim 1 wherein the hydrophobic thermoplastic organic polymeric material is polyethylene terephthalate.

3. A process for the continuous one-side coating of a continuous web which comprises partially submerging a rotating cylindrical surface rotating on a fixed axis in a bath of an aqueous dispersion coating composition having a viscosity of no greater than 100 centipoises to apply said coating composition to said surface; controlling the thickness of said coating composition by means of a second rotating cylindrical surface partially submerged in said bath and rotating in a direction opposite to the direction of the first named cylindrical surface on an axis parallel to the axis of said first named cylindrical surface and at substantially the same speed, said surfaces being spaced apart a distance equal to substantially twice the desired thickness of the coating; tangentially contacting one surface of a continuously advancing non-fibrous web of hydrophobic thermoplastic organic polymeric material, advancing at a constant predetermined speed, with the rotating coated cylindrical surface carrying the controlled thickness of coating composition, said coated cylindrical surface rotating in a direction opposite that of the web and at a constant peripheral speed of from 15% to 50% greater than the speed of the web whereby to apply a uniform coating of said coating composition to said web surface; and thereafter passing the coated surface of said web over at least one rotating cylindrical surface rotating in a direction opposite to the direction of travel of said web and at a constant peripheral speed of from 10% to 100% of the linear speed of said web.

4. The process of claim 3 wherein the hydrophobic thermoplastic organic polymeric material is polyethylene terephthalate.

References Cited in the file of this patent

UNITED STATES PATENTS

| | | |
|---|---|---|
| 1,851,761 | Everett | Mar. 29, 1932 |
| 1,933,963 | Bradner | Nov. 7, 1933 |
| 2,128,516 | Graham | Aug. 30, 1938 |

FOREIGN PATENTS

| | | |
|---|---|---|
| 783,335 | France | July 11, 1935 |